United States Patent
Grover et al.

(10) Patent No.: US 11,792,162 B1
(45) Date of Patent: Oct. 17, 2023

(54) MACHINE LEARNING BASED WEB APPLICATION FIREWALL

(71) Applicant: CLOUDFLARE, INC., San Francisco, CA (US)

(72) Inventors: Vikram Grover, London (GB); Petre Gabriel Gabor, London (GB); Nicholas Mikhail Robert, London (GB)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 18/161,719

(22) Filed: Jan. 30, 2023

(51) Int. Cl.
*H04L 9/40* (2022.01)
*G06F 30/27* (2020.01)
*H04L 41/16* (2022.01)

(52) U.S. Cl.
CPC .......... *H04L 63/0263* (2013.01); *G06F 30/27* (2020.01); *H04L 41/16* (2013.01); *H04L 63/1416* (2013.01)

(58) Field of Classification Search
CPC . H04L 63/0263; H04L 63/1416; H04L 41/16; G06F 30/27
See application file for complete search history.

(56) References Cited

U.S. PATENT DOCUMENTS

| | | | |
|---|---|---|---|
| 10,659,483 B1 * | 5/2020 | Marelas | H04L 63/1408 |
| 10,664,619 B1 * | 5/2020 | Marelas | G06N 5/01 |
| 11,025,649 B1 * | 6/2021 | Bilge | G06F 21/566 |
| 2012/0227105 A1 * | 9/2012 | Friedrichs | H04L 63/1416 726/22 |

(Continued)

FOREIGN PATENT DOCUMENTS

CN 111049819 A * 4/2020

OTHER PUBLICATIONS

Wang, Rui, et al. "Machine learning based cross-site scripting detection in online social network." 2014 IEEE Intl Conf on High Performance Computing and Communications, 2014 IEEE 6th Intl Symp on Cyberspace Safety and Security, IEEE, 2014 (Year: 2014).*

(Continued)

*Primary Examiner* — Jung W Kim
*Assistant Examiner* — Sameera Wickramasuriya
(74) *Attorney, Agent, or Firm* — NICHOLSON DE VOS WEBSTER & ELLIOTT LLP

(57) ABSTRACT

A machine learning (ML) based web application firewall (WAF) is described. Transformation(s) are applied to raw data including normalizing and generating a signature over the normalized data. The signature and the normalized data are vectorized to create a first and second vector of integers that are input into an ML model that includes a first stage that operates on the first vector of integers to identify candidate signature tokens that are commonly associated with different classes of attack, and a second stage that operates on the candidate signature tokens and the second vector of integers and conditions attention on the second vector of integers on the candidate signature tokens. The ML model outputs a score that indicates a probability of the raw data being of a type that is malicious. A traffic processing rule is enforced that instructs a WAF to block traffic when the score is above a threshold.

21 Claims, 5 Drawing Sheets

(56) References Cited

U.S. PATENT DOCUMENTS

| | | | | |
|---|---|---|---|---|
| 2015/0128263 A1* | 5/2015 | Raugas | ................ | G06F 21/552 |
| | | | | 726/23 |
| 2019/0007434 A1* | 1/2019 | McLane | .................. | G06F 21/55 |
| 2019/0182274 A1* | 6/2019 | Doron | .................... | G06N 3/044 |
| 2019/0215330 A1* | 7/2019 | Neuvirth | ............. | H04L 63/1425 |
| 2020/0042706 A1* | 2/2020 | Allen | ........................ | G06F 8/10 |
| 2020/0186548 A1* | 6/2020 | Alagar | .................... | H04L 67/02 |
| 2020/0327225 A1* | 10/2020 | Nguyen | ................ | G06N 3/044 |
| 2021/0185059 A1* | 6/2021 | Achleitner | ............ | H04L 43/028 |
| 2022/0094713 A1* | 3/2022 | Lee | ....................... | G06F 18/214 |

OTHER PUBLICATIONS

Vishnu, B. A., and K. P. Jevitha. "Prediction of cross-site scripting attack using machine learning algorithms." Proceedings of the 2014 International Conference on Interdisciplinary Advances in Applied Computing. 2014. (Year: 2014).*

Arik et al., TabNet: Attentive Interpretable Tabular Learning, Google Cloud AI, Dec. 9, 2020, 13 pages.

* cited by examiner

MACHINE LEARNING BASED WEB APPLICATION FIREWALL

FIELD

Embodiments of the invention relate to the field of web application firewalls; and more specifically, to a machine learning based web application firewall.

BACKGROUND

A web application firewall (WAF) is a network security solution that analyzes an HTTP request and determines whether the request should be dropped or processed. Conventionally, the WAF can analyze the request to determine whether it contains any data that can cause damage to a destination server system and/or was generated by an entity with malicious intent. A WAF typically protects applications from attacks such as cross-site-scripting (XSS), file inclusion, and SQL injection (SQLi), among others. These attacks can result in the loss of sensitive user data and damage to critical software infrastructure, leading to monetary loss and reputation risk, along with direct harm to customers. Most WAFs are rule based which means they block traffic based on a set of predefined signatures.

A WAF is normally deployed as a reverse proxy in front of the application, and can be hosted both as a virtual appliance, physical device, or as part of a native cloud platform. Due to its position and intended function, WAFs must have full access to payload data and therefore normally must perform encryption and decryption functions.

Conventionally, there are two security models for analyzing traffic that are commonly used. A positive security model rejects everything that is not an "allowed list" or "approved list." In the context of a WAF, only requests known a-priori to be safe are permitted to pass while all other traffic is blocked. A fuzzier version of this approach is to learn from historical "known good" requests to identify acceptable HTTP traffic and reject everything else. A negative security model allows everything except those that match a "block list" or "deny list." In the context of a WAF, content is compared to pre-determined signatures or patterns, and rejected only if a match against disallowed rules is found. This approach is used to prevent attacks that may exploit specific, known vulnerabilities, or contain one or more components of known dangerous payloads.

Each model has advantages and disadvantages. A solution based on a positive security model is effective in identifying and reducing zero-day or new novel attacks and may be robust against variants of attacks but may result in a greater administrative burden caused by the higher rate of false positives. Due to the varied nature of web traffic, these kinds of solutions are prone to generating high volumes of uninteresting alerts, resulting in user fatigue and are therefore only deployed when there is a well-defined data format, such as for API endpoints. Conversely, the negative security model results in the fewest false positives while also offering strong guarantees that content known to be malicious will be intercepted. This approach is well suited to the high volumes and varied formats of web traffic that HTTP endpoints receive, such as generic web-based applications intended for browser consumption.

A signature based WAF solution includes independent hand-crafted patterns or policies matching known attacks, leading to a few immediate consequences. Rules-based approaches may not be able to use historical data to improve the quality of the filtering, as there is no way to utilize it except by having human security experts craft new rules. Static rules are inherently ineffective at identifying unusual or novel payloads for discovery and investigation purposes (proactive vs reactive). Further, rules can be sensitive to small byte changes or alterations in the signature (fuzzing) which are semantics-preserving, depending on implementation. Thus, two payloads that are functionally similar may not be treated the same by the WAF.

SUMMARY

A machine learning (ML) based web application firewall (WAF) is described. Transformation(s) are applied to raw data including normalizing and generating a signature over the normalized data. The signature and the normalized data are vectorized to create a first and second vector of integers respectively. The first and second vector of integers are input into an ML model that uses a multiple stage process including a first stage that operates on the first vector of integers to identify candidate signature tokens that are commonly associated with different classes of attack, and a second stage that operates on the candidate signature tokens and the second vector of integers and conditions attention on the second vector of integers on the candidate signature tokens. The ML model outputs a score that indicates a probability of the raw data being of a type that is malicious. A traffic processing rule is enforced that instructs a WAF to block traffic when the score is above a threshold that indicates the raw data is of the type that is malicious.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A machine learning (ML) based web application firewall (WAF) is described. The ML based-WAF takes one or more views of raw HTTP input and performs one or more transformations on the raw HTTP input data. The one or more transformations may include normalization and generation of a signature over the normalized data. A multidimensional input vector is created that includes a first vector of integers created by vectorizing the generated signature and includes a second vector of integers created by vectorizing the normalized data. The multidimensional input vector is processed by a machine learning model that uses elements of hierarchical self-attention and multi-step candidate selection that causes the model to consider only some of the available data and condition attention on the normalized data vector on the signature vector. The result of the machine learning model can be a score that provides a probability of the classification of the request (e.g., normal, malicious) and therefore provides a probability of whether the request is malicious. The scores can be used in WAF rules.

Figure 1:
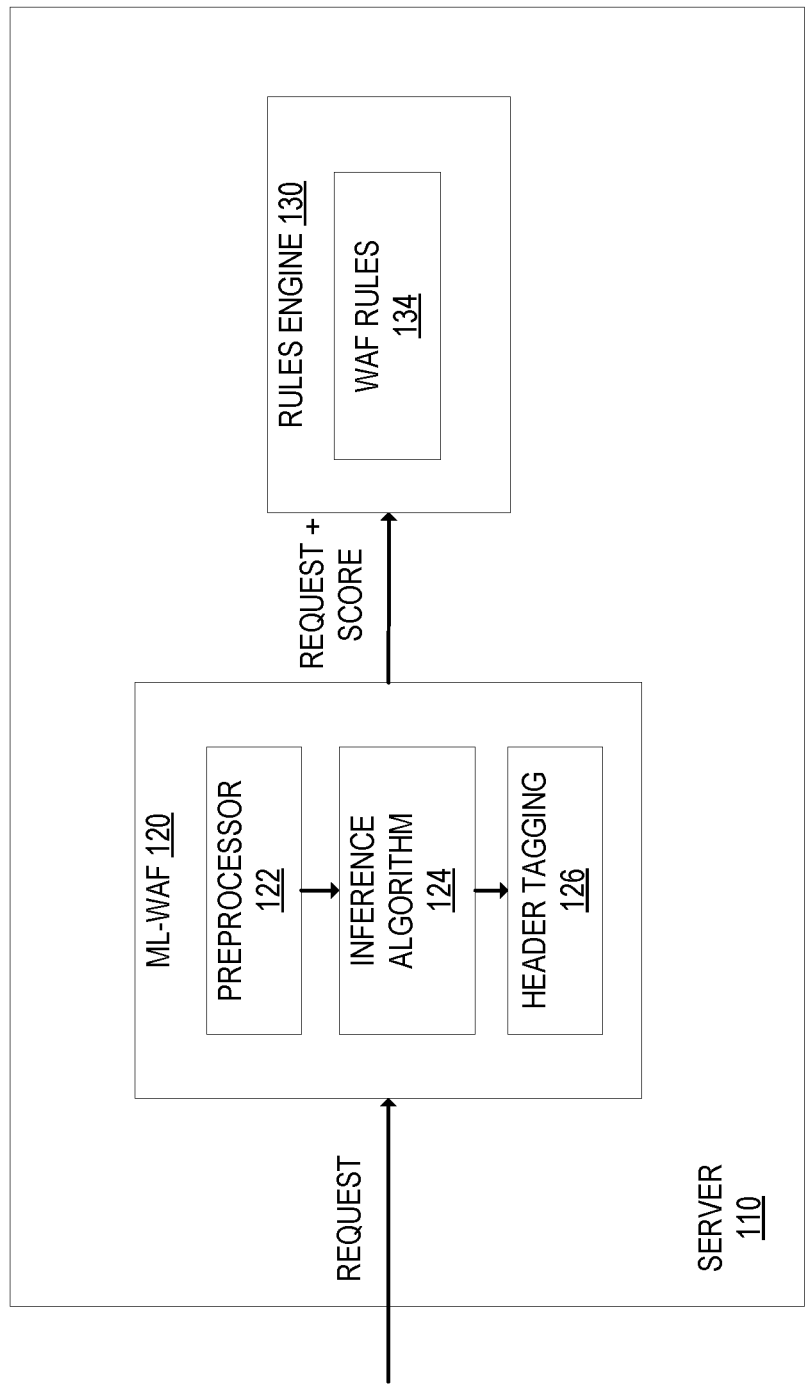
FIG. 1 is an exemplary system for an ML based WAF according to an embodiment.

FIG. 1 is an exemplary system for an ML based WAF according to an embodiment. The system includes a server 110 that receives network traffic (e.g., HTTP/S requests) and processes the traffic using an ML based WAF. The server 110 may be part of a distributed cloud computing network. As an example, the server 110 may be part of a data center of the distributed cloud computing network. There may be multiple data centers of the distributed cloud computing network. Each data center may include one or more servers, one or more DNS servers (e.g., one or more authoritative name servers, one or more proxy DNS servers), and one or more other pieces of network equipment such as router(s), switch(es), and/or hubs. The server 110 may operate as a reverse proxy or a forward proxy. In either case, the server 110 may receive requests from client devices for content located on the distributed cloud computing network and/or external to the distributed cloud computing network.

The server 110 includes the ML-WAF 120 and the rules engine 130. The ML-WAF 120 implements a classifier to distinguish various traffic types and attack vectors such as SQLi, XSS, and command injection based on structural and/or statistical properties of the content (e.g., request data). The ML-WAF 120 may run on each request (e.g., each HTTP/S request) and compute a score that indicates a probability that the request is malicious (e.g., one of the types of attack vectors the model is trained for such as SQLi, XSS, and/or RCE). Although not shown in FIG. 1, the machine learning model may be trained at a separate server (e.g., a control server) and the model may be distributed to the server 110 and other compute servers of the distributed cloud computing network.

The ML-WAF 120 receives raw input (e.g., HTTP/S input) and performs one or more transformations including normalization, content substitutions, and/or de-duplication. The ML-WAF 120 performs a tokenization process on the transformed data that generates statistical information about the content and/or extracts structural data. The ML-WAF 120 classifies the numerical representations against certain classes (e.g., XSS, SQLi, RCE, etc.), scores, or other target of interest. For instance, after receiving a request, the ML-WAF 120 uses previously learned representations and mappings to analyze the request and provide the most likely label or score for it. As an example, the ML-WAF 120 indicates a likelihood of whether the request is malicious (e.g., a probability that the request is of the following types: normal, XSS, SQLi, and/or RCE). The output of the ML-WAF can be used by the rules engine 130 for processing the traffic (e.g., blocking the traffic if the score is indicative of a malicious request).

Figure 2:
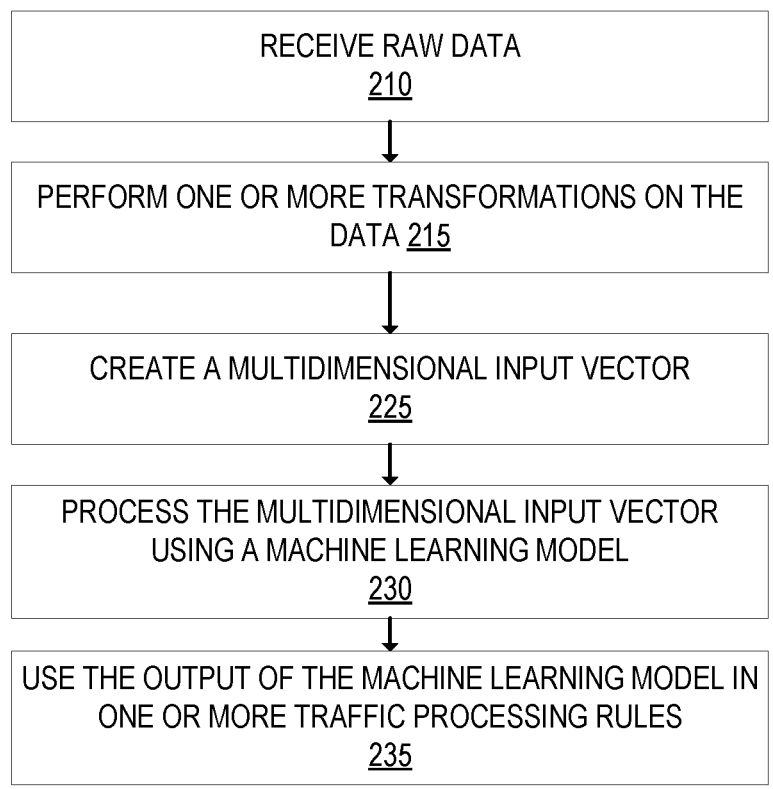
FIG. 2 is a flow diagram that illustrates exemplary operations for a machine learning web application firewall according to an embodiment.

FIG. 2 is a flow diagram that illustrates exemplary operations for a machine learning web application firewall according to an embodiment. The operations of FIG. 2 are described with reference to the exemplary embodiment of FIG. 1. However, the operations of FIG. 2 can be performed by different embodiments than that of FIG. 1, and the exemplary embodiment of FIG. 1 can perform different operations from that of FIG. 2.

At operation 210, the ML-WAF 120 receives raw data such as raw HTTP/S data. In the case of an HTTP request, the raw data includes one or more parts of the request such as the RequestURI, Referer-Path, User-Agent, Content-Type, Body, and/or other headers. This content may or may not be valid UTF-8 and may contain fuzzing, encoding, malicious content, etc.

Next, at operation 215, the preprocessor 122 of the ML-WAF 120 performs one or more transformations on the data. The transformation(s) include normalization, content substitutions, and/or de-duplication. The transformation(s) may be performed separately for separate parts of the raw HTTP/S data. For example, the transformation(s) may be applied separately to each part of the request such as the RequestURI, Referer-Path, User-Agent, Content-Type, Body, and/or other headers. The transformation(s) may include performing one or more of the following: URL-decode (single or recursive), replace HTML entities, replace JavaScript entities (e.g., map instances of characters represented as 'uXXX' or 'u{XX}' to their ASCII representation), replace hex entities (e.g., map instances of characters represented as \\xSSS to their ASCII representation), base64 decode, and/or character substitution (e.g., replacing all instances of one or more characters with a replacement such as mapping digits 0-9 to a special token). Preprocessing the data may also include generating a signature on the data (e.g., the normalized data and/or the raw data). The signature may replace each contiguous sequence of non-special characters with a placeholder token. For example, the string "sc_snum=1&sess=b73b242435=6' AND NVL(ASCII (SUBSTR((SELECT 1 FROM DUAL),1,1)),0)>255" may be replaced with $\eta=\eta\&\eta=\eta=\eta'\eta\eta(\eta(\eta((\eta\eta\eta\eta),\eta,\eta)),\eta)>\eta$.

Next, at operation 225, the preprocessor 122 creates a multidimensional input vector that is input to the machine learning model. The preprocessor 122 may transform the byte-string content (pre or post transformations) into vectors of integers where each integer represents a token in a finite vocabulary. In an embodiment, to create the vector of integers, a type of tokenizer that yields, for a given list of tokens, the number of times each token appears in the content is used. For example, given a fixed, ordered vocabulary of length N: {w1, w2, w3, . . . wn} and a block of content R, count the occurrences of each token in R and construct a vector of integers of length N where the ith position of the vector corresponds to the number of occurrences of the ith token. Other algorithms may be used to vectorize the data such as TF-IDF, FastText, Word2Vec, and GloVe. In another embodiment, a subword tokenization may be performed by the preprocessor 122.

The multidimensional input vector may include a vector of integers on the generated signature, a vector of integers on the normalized data, and/or a vector of integers on the raw data. These separate vectors of integers may be concatenated to form the multidimensional input vector. There may be a multidimensional input vector created for each part of the data. For example, there may be a separate multidimensional input vector created for the RequestURI, Referer-Path, User-Agent, Content-Type, Body, and/or other headers.

The token vocabulary is a list of n-grams (e.g., between 1000 and 25000 n-grams). The vocabulary is not guaranteed to cover all possible inputs. As a result, it is possible for an input to be mapped to a vector of all zeros. There may be multiple counting of vocabulary tokens (they are overlapping, not disjoint). The output vector may be of fixed length regardless of the length of the input. The vocabulary tokens are not guaranteed to be safely escaped or even valid unicode, and thus should be treated as vec<u8>objects. The token vocabulary file may be included with the model file. The size of the vocabulary file is subject to considerations about time to compute the lookup, peak memory allocation(s), and model inference runtime.

Figure 3:
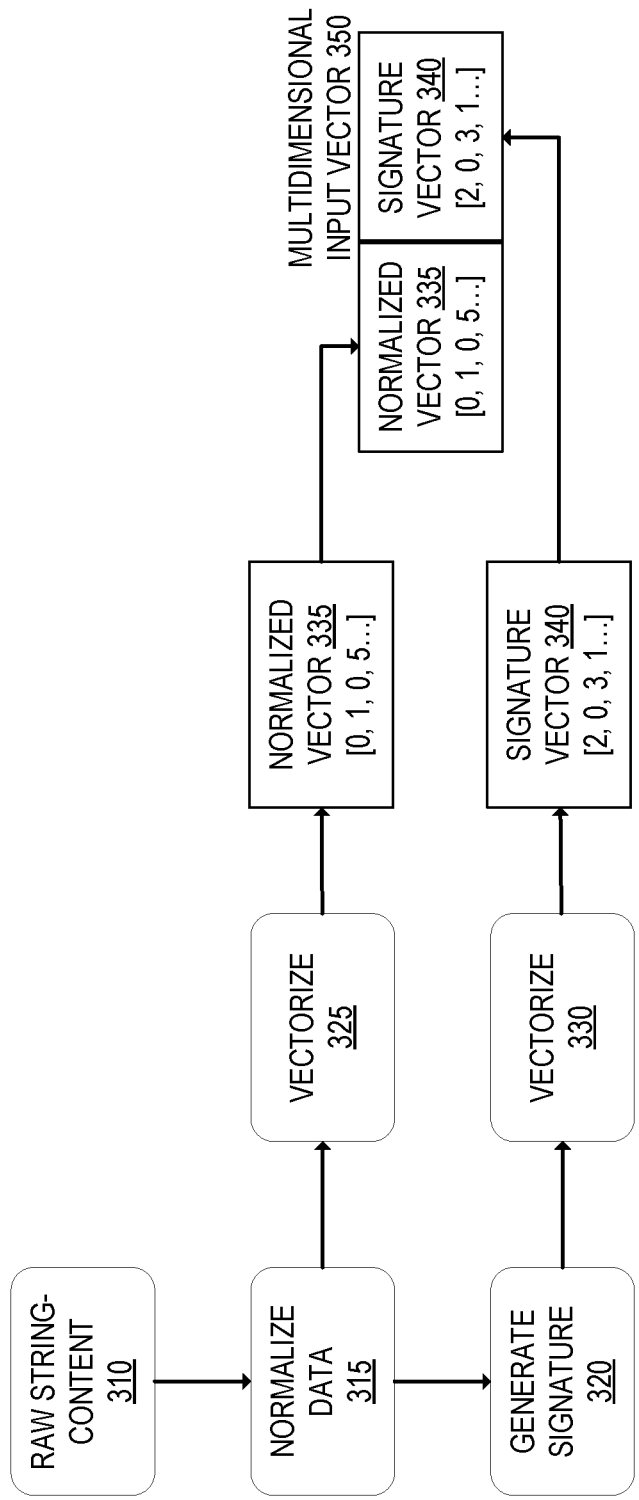
FIG. 3 illustrates exemplary operations for generating a multidimensional input vector according to an embodiment.

FIG. 3 illustrates exemplary operations for generating a multidimensional input vector according to an embodiment. At operation 310, a raw string content is received. For example, the preprocessor 122 receives an HTTP request. In the case of an HTTP request, the raw string content can include one or more parts of the request such as the RequestURI, Referer-Path, User-Agent, Content-Type, Body, and/or other headers. The operations of FIG. 3 may be performed for each part of the request. At operation 315, the raw string content is normalized. For example, the preprocessor 122 normalizes the data of the HTTP request as previously described. A signature is generated from the normalized data at operation 320. For instance, the preprocessor 122 generates a signature from the normalized data as previously described. The preprocessor 124 vectorizes the normalized data at operation 325 to produce the normalized vector 335. The preprocessor 124 vectorizes the generated signature at operation 330 to produce the signature vector 340. The vectorization can be done like as described herein. The normalized vector 335 and the signature vector 340 combine to make the multidimensional input vector 350.

The multidimensional input vector(s) are provided to the inference algorithm 124. The inference algorithm is a machine learning model that accepts the multidimensional input vectors, performs inference, and outputs a result vector. The result vector may be a discrete probability distribution against certain classes (e.g., normal, SQLi, XSS, RCE). For example, the inference algorithm 124 takes an input X, and output takes the form of a N-tuple of <p1, p2, . . . pn> that sum to 1.0, with each p_i being interpreted as a probability that x is a sample from class i. Each part of the data (e.g., RequestURI, Referer-Path, User-Agent, Content-Type, Body, and/or other headers) is independently processed by the inference algorithm 124 and yields a separate n-tuple of class probabilities.

At operation 230, the inference algorithm 124 processes the multidimensional input vector(s) using a machine learning model. The machine learning model, in an embodiment, is not any of the following models: a linear logistic multinomial, a fully connected model, and a recurrent/sequential/transformer.

The machine learning model has the following properties in an embodiment: robustness, structure awareness, semantics invariance, embedded-payload insensitivity, obfuscation awareness, and/or interpretability.

Robustness means that small mutations to an input string (e.g., a character insertion or substitution) will not result in the score changing sharply. That is, the score is relatively insensitive to small alterations to the input. This provides the advantage that it is more difficult to automate attacks compared to conventional methods because all inputs within a predefined distance of a valid payload will yield similar scores. As an example, the following groups of inputs should yield approximately the same scores because they only change by a few byte alternations:

```
XSS:
<img src=# onmouseover="alert('1')">
<img src=# onmouseover="alert('2')">
<img   src= onmouseover= 'alert("1")'>
<img src=a b=onmouseover="alert( )">
```

Structure awareness means that the model can distinguish between malicious content and content with only statistical or locally scoped structural similarity to payloads. The model requires high order, non-local structure and semantics to assign high risk to an input. Essentially, structure awareness resists false-positives because the model does not rely on observing specific high-risk keywords or character sequences and instead uses a holistic analysis of content and context. For example, the following input samples are not for a SQLi attack even though they have a similar structure to one:

```
Pseudo-random string drawn from frequent ngrams of sql-injection payloads and noise:
?id=or))=itn.= i"((+chr=1,,0"r)\o+r%201%((or"))e=g("io-n%20)sel\%27,e%20c#,)cat(,0x%20
SQL language identifiers not forming anything resembling a SQL statement:
?id={content:select union from concat where xor or sleep}
SQL language identifiers and some local structure is present, but there is no broader structure:
?id =-1%20OR+%22and%3d(SELECT%20char(107)2,2471)or/**/7);union[0))a>&sleep][ ]
```

Semantics invariance means that the model will treat different input strings approximately the same if their structure has equivalent risk in a particular execution context and only constants change. This helps protect against fuzzing attacks that replace constants with random strings to evade signature filters. For example, the following strings are treated approximately the same by the model:

```
x' and 'wfm4nkxijrrhs1x3r8'='wfm4nkxijrrhs1x3r8' --#
h' and '9f7'='9f7' --#
ca' and 'z149nupo'='z149nupo' --#
```

Embedded-payload insensitivity means that the model does not decrease the risk score of an input string when additional data is appended to the input string. This provides padding resistance to help protect against attackers appending junk data to requests to either exceed the maximum length of content to be analyzed or watering down risk content in large quantities of random content. As an example, the risk for the following query strings should be similar even though the latter contains junk padding around the payload:

```
?a=' or 1=1--
a=b&c=d&e=f& (...omitted many kB of content) &abcdf=' or 1=1 -- &abcdef=123&..
```

Obfuscation awareness means that the model should treat input strings that include mixed or higher-entropy representations of content, or transformed subsequences normalized into high-risk content as higher risk than if the input string was raw. This helps protect against an attack encoding the content in such a way that a signature cannot recognize it such as URL-encoding, JavaScript character escapes, HTML encoding, etc.

Interpretability means that the model should allow for developers and/or users to understand what aspects of the content are triggering a given rule or filter. This helps in making a determination on whether the filter is working as intended and helps find offending content.

In an embodiment, the machine learning model is a multiple stage process where the first stage includes identifying candidate subsets of signature tokens that are commonly associated with different classes of an attack and the second stage is conditioned on the result of the first stage. The machine learning model processes a given multidimensional input vector by using elements of hierarchical self-attention and multi-step candidate selection that forces the model to consider only some of the available data (e.g., the tokens that are important at each hierarchical step), and explicitly condition the attention on one of the vector of integers (a first dimension) on another one of the vector of integers (a second dimension). In an embodiment where the multidimensional input vector includes a first vector of integers on the generated signature and a second vector of integers on the normalized data, the model may explicitly condition the attention on the second vector of integers on the normalized data on the signature tokens.

For example, the first stage of the machine learning model includes a first attention layer operating on the first vector of integers to build a signature context (that defines signature tokens that are relevant to the classification task which in this case are signature tokens that are commonly associated with different classes of attack). Thus, a signature context may specify signature tokens that are commonly associated with different classes of attack. The signature context may take the form of a vector of floats. Internal weights are calculated based on the context of the input elements and their relationships rather than just the individual input elements. This enables the model to prioritize certain signature tokens while ignoring others. The signature context and the second set of integers are used at the second stage of the machine learning model that includes a second attention layer to establish an additional relation to determine which normal tokens to look for.

For example, the machine learning model analyzes the first vector of integers on the generated signature, and depending on what it finds, places a probability weight on a pattern of signature tokens (the signature tokens observed) to yield a signature context. From that signature context, the model determines which normal tokens to look for (in the second vector of integers on the normalized data) by placing the probability over semantically relevant normal tokens. If the signature tokens do not suggest the presence of a particular class of normal token, the probability assigned to those by the norm mask will be low, and the model does not take them into account very much. This essentially means that the model first needs to have evidence (from the semantic structure of the content) before it looks for concrete text tokens in the normalized data. This restricts the kinds of associations it can learn between tokens and the information bottleneck acts like a natural regularization. This model has a forced hierarchical conditioning that causes the model to restrict the information it sees and it is not allowed to find arbitrary correlations. The self-attention blocks function as intentional representational bottlenecks (these self-attention blocks behave like mini asymmetric context encoders).

At operation 235, the output of the model is used in one or more traffic processing rules. The output indicates a likelihood of whether the request is malicious. For instance, the output may include one or more scores based on the likelihood that the request is malicious including a SQLi attack score (a score indicating the likelihood that the request is an SQL injection attack vector), an XSS attack score (a score indicating the likelihood that the request is a cross-site scripting (XSS) attack vector, an remote code execution (RCE) attack score (a score indicating the likelihood that the request is an RCE attack vector, and/or a global score (a score that combines multiple scores of each attack vector into a single score). With respect to FIG. 1, the rules engine 130 may receive the request and score(s) and apply the WAF rules 134. As an example, the header tagging 126 can append the output score to the request headers and transmit the request to the headers that are received by the rules engine 130.

Figure 4:
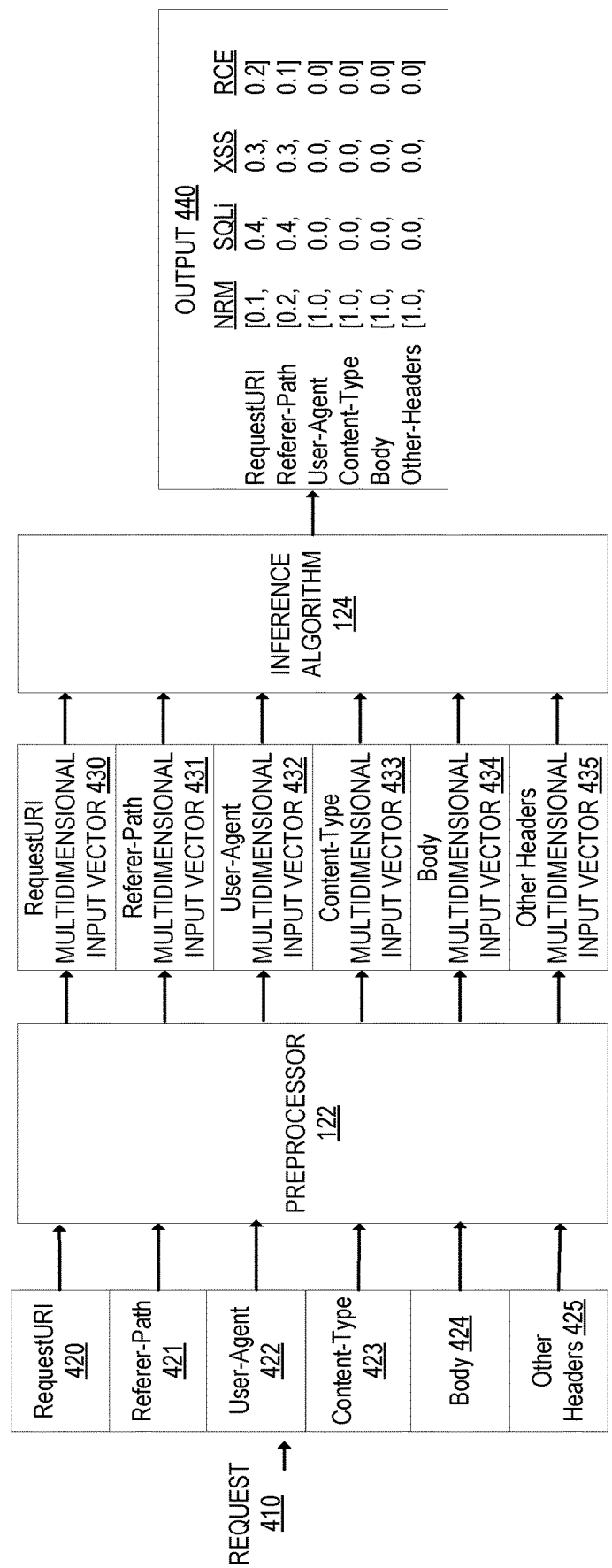
FIG. 4 shows an example of creating a multidimensional input vector for multiple parts of an HTTP request and processing those input vectors by the machine learning model according to an embodiment.

As previously described, a multidimensional input vector is created for multiple parts of the raw input (e.g., multiple parts of the HTTP request). FIG. 4 shows an example of creating a multidimensional input vector for multiple parts of an HTTP request and processing those input vectors by the machine learning model according to an embodiment. The request 410 is received at the server 110. The request 410 is broken apart into multiple parts including the RequestURI 420, the Referer-Path 421, the User-Agent 422, the Content-Type 423, the body 424, and other headers 425. The other headers 425 field may include everything of the HTTP request that does not fit any of the other categories shown in FIG. 4. Each of the parts 420-425 is separately processed by the preprocessor 122. The result is a separate multidimensional input vector for each of the parts 420-425 including the RequestURI multidimensional input vector 430, the Referer-Path multidimensional input vector 431, the User-Agent multidimensional input vector 432, the Content-Type multidimensional input vector 433, the body multidimensional input vector 434, and the other headers multidimensional input vector 435 respectively. These multidimensional input vectors are processed by the inference algorithm 124 like as earlier described. The output 440 shows a discrete probability over four classes (normal, SQLi, XSS, RCE) for each of the request parts.

The usage of the array of probability scores is different in different embodiments. In one embodiment, the scores are not aggregated and the scores are available for each request field. This allows a rule to be defined based on a specific target request field (e.g., a rule for a RequestURI, a separate rule for Referer-Path, etc.). In another embodiment, the scores are aggregated (e.g., the min or max scores) and only the aggregated score is used. This allows a rule to be defined based on a threshold that is reflected across each field in aggregate. In another embodiment, a global score is calculated that combines the scores. For example, the field with the max probability from the model output (pre-transformation) of the classes (e.g., SQLi, XSS, RCE) out of all the request fields and using class probabilities from that field to obtain the global score. As an example, if the RequestURI field out of the request fields has the max probability of 0.5 corresponding to the SQLi class, the probabilities from the RequestURI field are used. The probabilities are inverted and normalized (e.g., 1 to 99) to get the final score.

Model Training

The machine learning model can be trained using samples of real data collected by the servers of the distributed cloud computing network. The real data may also come from other online sources. The real data may include data that is normal/benign and data that is known to be malicious (e.g., SQLi, XSS, and/or RCE attack data). The model may be trained at a server separate from the server 110.

The training data may also include artificial data. For example, data augmentation may be used to build a training set such that the model does not rely on observing specific high-risk keywords or character sequences but instead uses a holistic analysis of content and context. This makes the model less likely to block legitimate requests (false positives). To reduce false positives and improve overall performance, the augmented data may include many heterogeneous negative samples to force the model to consider the structural, semantic, and statistical properties of the content when making a classification decision. To perform the data augmentation, benign content may be mutated in multiple ways while keeping the content as benign such as: adding random character noise, permuting keywords, and merging benign content together from multiple sources. The benign content may also be seeded with 'risky' keywords or n-grams frequently occurring in payloads while keeping the content benign. This trains the model to not be sensitive to the presence of malicious tokens lacking the proper semantics and structure.

The artificial data may include malicious data. For example, for known malicious data, a process of fuzzing the payload by applying transformations that preserve the underlying semantics while changing the representation or adding obfuscation.

The artificial data may include data that is generated using large numbers of pseudo-random strings of varying complexity. The probability of any pseudo-random string (drawn from essentially any token distribution) being a valid payload or malicious attack is essentially zero. This approach is done by taking a collection of tokens and a probability distribution over these tokens, and independently sampling a stream of tokens from it to create a 'sample'. Each sample length is selected from a separate discrete sample length distribution. This results in better performance in terms of false positive rate, robustness, and overall model properties. As an example, the collections can include alphanumeric characters, special characters, JavaScript keywords, SQL keywords, fragments of valid URIs, user agents, XML/XSLT content, restricted language identifiers, and/or restricted keywords.

Figure 5:
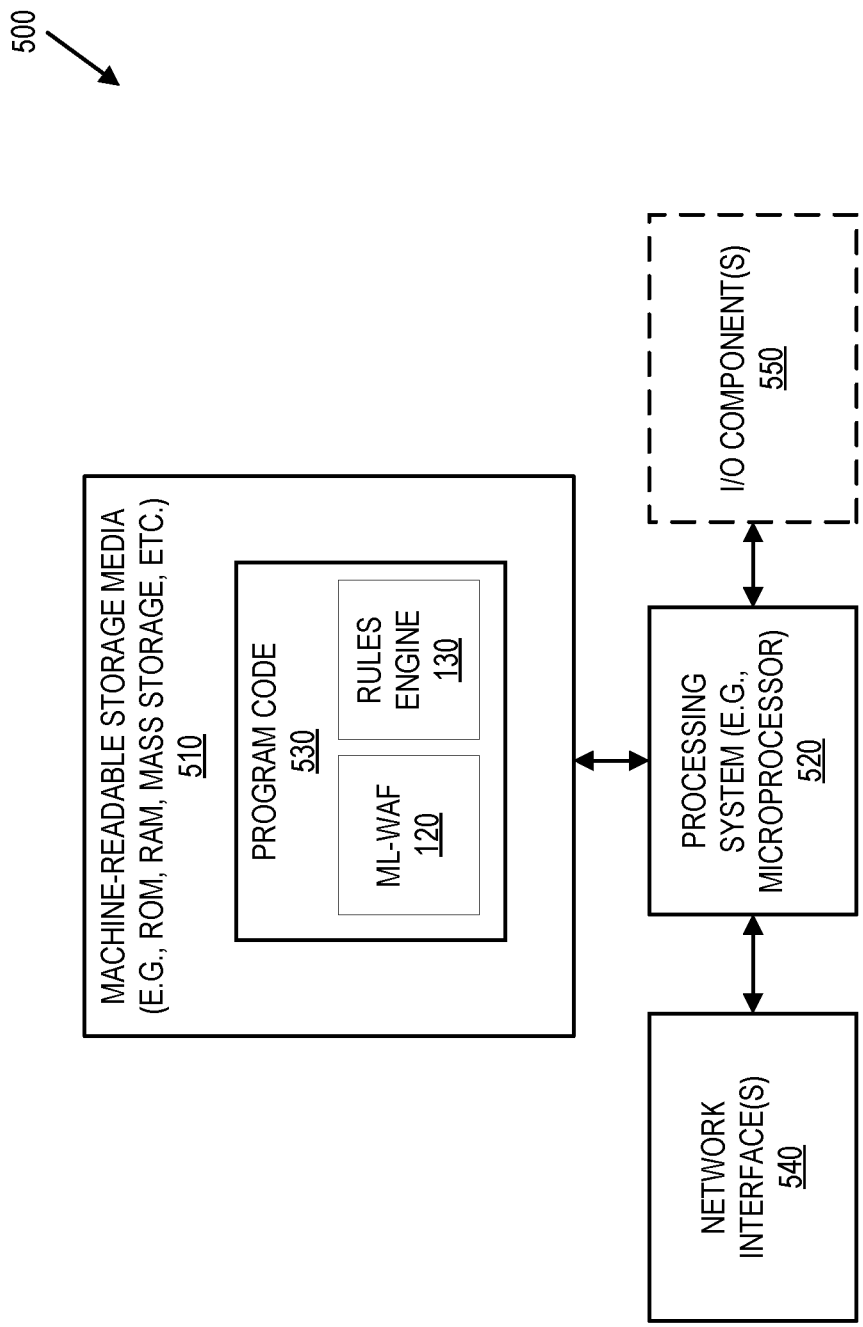
FIG. 5 is a block diagram illustrating a data processing system that can be used in an embodiment.

FIG. 5 illustrates a block diagram for an exemplary data processing system 500 that may be used in some embodiments. One or more such data processing systems 500 may be used to implement the embodiments and operations described with respect to the server 110. The data processing system 500 is a computing device that stores and transmits (internally and/or with other computing devices over a network) code (which is composed of software instructions and which is sometimes referred to as computer program code or a computer program) and/or data using machine-readable media (also called computer-readable media), such as machine-readable storage media 510 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 520 (e.g., one or more processors and connected system components such as multiple connected chips). For example, the depicted machine-readable storage media 510 may store program code 530 that, when executed by the processor(s) 520, causes the data processing system 500 to execute the ML-WAF 120 and the rules engine 130 and/or perform any of the operations described herein.

The data processing system 500 also includes one or more network interfaces 540 (e.g., a wired and/or wireless interfaces) that allows the data processing system 500 to transmit data and receive data from other computing devices, typically across one or more networks (e.g., Local Area Networks (LANs), the Internet, etc.). The data processing system 500 may also include one or more input or output ("I/O") components 550 such as a mouse, keypad, keyboard, a touch panel or a multi-touch input panel, camera, other known I/O devices or a combination of such I/O devices. Additional components, not shown, may also be part of the system 500, and, in certain embodiments, fewer components than that shown are used. One or more buses may be used to interconnect the various components shown in FIG. 5.

The techniques shown in the figures can be implemented using code and data stored and executed on one or more electronic devices (e.g., a server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

In the preceding description, numerous specific details are set forth to provide a more thorough understanding. It will be appreciated, however, by one skilled in the art that embodiments may be practiced without such specific details. In other instances, control structures, gate level circuits and full software instruction sequences have not been shown in detail in order not to obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for a machine learning (ML) based web application firewall (WAF), comprising:
    receiving raw data;
    performing one or more transformations on the received raw data including:
       normalizing the received raw data, and
       generating a signature over the normalized data;
    vectorizing the generated signature to create a first vector of integers;
    vectorizing the normalized data to create a second vector of integers;
    inputting the first vector of integers and the second vector of integers into a machine learning model;
    processing, at the machine learning model, the first vector of integers and the second vector of integers, wherein the machine learning model uses a multiple stage process including:
       a first stage that operates on the first vector of integers to identify candidate signature tokens that are commonly associated with different classes of attack, and
       a second stage that operates on the candidate signature tokens and the second vector of integers and conditions attention on the second vector of integers on the candidate signature tokens;
    wherein the machine learning model outputs a score that indicates a probability of the raw data being of a type that is malicious; and
    enforcing a traffic processing rule for the received raw data that instructs the WAF to block traffic when the score is above a threshold that indicates the raw data is of the type that is malicious.

2. The method of claim 1, wherein the raw data is a Hypertext Transfer Protocol (HTTP) request.

3. The method of claim 2, further comprising:
    extracting a plurality of parts of the HTTP request; and
    wherein the one or more transformations are performed on each of the extracted plurality of parts of the HTTP request.

4. The method of claim 3, wherein the plurality of parts of the HTTP request include at least two of:
    RequestURI;
    Referer-Path;
    User-Agent;
    Content-Type; and
    Body.

5. The method of claim 1, wherein generating the signature over the normalized data includes replacing each contiguous sequence of non-special characters with a placeholder token.

6. The method of claim 1, wherein the score is indicative of the raw data being of a type that is related to an SQL injection (SQLi) attack, a cross site scripting (XSS) attack, a remote code execution (RCE) attack.

7. The method of claim 1, wherein each integer in the second vector of integers represents a token in a finite vocabulary.

8. A non-transitory machine-readable storage medium that provides instructions that, if executed by a processor, will cause said processor to perform operations comprising:
    receiving raw data;
    performing one or more transformations on the received raw data including:
       normalizing the received raw data, and
       generating a signature over the normalized data;
    vectorizing the generated signature to create a first vector of integers;
    vectorizing the normalized data to create a second vector of integers;
    inputting the first vector of integers and the second vector of integers into a machine learning model;
    processing, at the machine learning model, the first vector of integers and the second vector of integers, wherein the machine learning model uses a multiple stage process including:
       a first stage that operates on the first vector of integers to identify candidate signature tokens that are commonly associated with different classes of attack, and
       a second stage that operates on the candidate signature tokens and the second vector of integers and conditions attention on the second vector of integers on the candidate signature tokens;
    wherein the machine learning model outputs a score that indicates a probability of the raw data being of a type that is malicious; and
    enforcing a traffic processing rule for the received raw data that instructs a web application firewall (WAF) to block traffic when the score is above a threshold that indicates the raw data is of the type that is malicious.

9. The non-transitory machine-readable storage medium of claim 8, wherein the raw data is a Hypertext Transfer Protocol (HTTP) request.

10. The non-transitory machine-readable storage medium of claim 9, wherein the operations further comprise:
    extracting a plurality of parts of the HTTP request; and
    wherein the one or more transformations are performed on each of the extracted plurality of parts of the HTTP request.

11. The non-transitory machine-readable storage medium of claim 10, wherein the plurality of parts of the HTTP request include at least two of:
    RequestURI;
    Referer-Path;
    User-Agent;
    Content-Type; and
    Body.

12. The non-transitory machine-readable storage medium of claim 8, wherein generating the signature over the normalized data includes replacing each contiguous sequence of non-special characters with a placeholder token.

13. The non-transitory machine-readable storage medium of claim 8, wherein the score is indicative of the raw data being of a type that is related to an SQL injection (SQLi) attack, a cross site scripting (XSS) attack, a remote code execution (RCE) attack.

14. The non-transitory machine-readable storage medium of claim 8, wherein each integer in the second vector of integers represents a token in a finite vocabulary.

15. An apparatus, comprising:
    a processor; and
    a non-transitory machine-readable storage medium that provides instructions that, if executed by the processor, will cause the apparatus to perform operations including:

receiving raw data;
performing one or more transformations on the received raw data including:
  normalizing the received raw data, and
  generating a signature over the normalized data;
vectorizing the generated signature to create a first vector of integers;
vectorizing the normalized data to create a second vector of integers;
inputting the first vector of integers and the second vector of integers into a machine learning model;
processing, at the machine learning model, the first vector of integers and the second vector of integers, wherein the machine learning model uses a multiple stage process including:
  a first stage that operates on the first vector of integers to identify candidate signature tokens that are commonly associated with different classes of attack, and
  a second stage that operates on the candidate signature tokens and the second vector of integers and conditions attention on the second vector of integers on the candidate signature tokens;
wherein the machine learning model outputs a score that indicates a probability of the raw data being of a type that is malicious; and
enforcing a traffic processing rule for the received raw data that instructs a web application firewall (WAF) to block traffic when the score is above a threshold that indicates the raw data is of the type that is malicious.

16. The apparatus of claim 15, wherein the raw data is a Hypertext Transfer Protocol (HTTP) request.

17. The apparatus of claim 16, wherein the operations further comprise:
  extracting a plurality of parts of the HTTP request; and
  wherein the one or more transformations are performed on each of the extracted plurality of parts of the HTTP request.

18. The apparatus of claim 17, wherein the plurality of parts of the HTTP request include at least two of:
  RequestURI;
  Referer-Path;
  User-Agent;
  Content-Type; and
  Body.

19. The apparatus of claim 15, wherein generating the signature over the normalized data includes replacing each contiguous sequence of non-special characters with a placeholder token.

20. The apparatus of claim 15, wherein the score is indicative of the raw data being of a type that is related to an SQL injection (SQLi) attack, a cross site scripting (XSS) attack, a remote code execution (RCE) attack.

21. The apparatus of claim 15, wherein each integer in the second vector of integers represents a token in a finite vocabulary.

* * * * *